(12) United States Patent
Billiu et al.

(10) Patent No.: US 6,209,944 B1
(45) Date of Patent: *Apr. 3, 2001

(54) STOWABLE TRUCK BED ENCLOSURE

(76) Inventors: Charles R. Billiu, 39341 W. Archer, Harrison Township, MI (US) 48045; David P. Piontek, 44426 Hanford, Canton, MI (US) 48187; George W. Klein, 26012 Cherry Hill, Dbn Hgts, MI (US) 48127

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,483

(22) Filed: Oct. 15, 1997

(51) Int. Cl.$^7$ ........................................ B60P 7/02
(52) U.S. Cl. .................. 296/100.02; 296/165; 296/160; 296/163; 296/159; 296/26.04
(58) Field of Search ........................ 296/156, 159, 296/160, 161, 163, 164, 165, 175, 176, 26.04, 26.05, 100.02, 26.06, 26.07, 168, 173, 100.06, 100.08, 100.1, 138; 135/88.05, 119, 88.01, 88.13, 88.17, 88.03

(56) References Cited

U.S. PATENT DOCUMENTS

| | | | |
|---|---|---|---|
| 1,300,021 | * 4/1919 | Richards | 296/161 |
| 2,957,482 | * 10/1960 | Tomek | 296/156 |
| 3,050,331 | 8/1962 | Mansen . | |
| 3,122,394 | * 2/1964 | Brydon | 135/119 X |
| 3,145,044 | 8/1964 | Harrison et al. . | |
| 3,151,908 | * 10/1964 | Horst | 296/100.02 |
| 3,194,251 | * 7/1965 | Pettersen | 296/163 |
| 3,286,414 | 11/1966 | Harrison et al. . | |
| 3,488,085 | * 1/1970 | Wallace | 296/168 |
| 3,495,866 | * 2/1970 | Bontrager | 296/26.05 |
| 3,536,352 | 10/1970 | Beckley . | |
| 3,675,885 | 7/1972 | Shute . | |
| 3,737,190 | * 6/1973 | Smith et al. | 296/159 |
| 3,743,345 | * 7/1973 | Eckman et al. | 296/26.05 |
| 3,924,889 | * 12/1975 | Gogush | 296/176 |
| 3,941,415 | 3/1976 | Cooper . | |
| 4,294,484 | * 10/1981 | Robertson | 296/156 |
| 4,310,194 | * 1/1982 | Biller | 296/159 |
| 4,328,989 | * 5/1982 | Childers | 196/175 X |
| 4,603,901 | * 8/1986 | McIntosh et al. | 296/26.05 X |
| 4,768,824 | 9/1988 | Andonian . | |
| 4,981,319 | * 1/1991 | Gerzeny et al. | 296/165 X |
| 5,161,851 | 11/1992 | Rafi-Zadeh . | |
| 5,364,154 | * 11/1994 | Kaiser | 296/165 X |
| 5,366,266 | 11/1994 | Harbison . | |
| 5,582,456 | * 12/1996 | Hammond | 296/163 |

FOREIGN PATENT DOCUMENTS

3104585 * 11/1982 (DE) ..................... 296/165

* cited by examiner

*Primary Examiner*—D. Glenn Dayoan
*Assistant Examiner*—Jason Morrow

(57) ABSTRACT

A stowable top or cover mounted on an open bed of a truck, such as a pickup truck, using lift frames and actuators in a manner to be raised above the bed. The cover and lift frames include attachment channels for connecting a flexible tent-like enclosure thereto such that the enclosure can be attached thereto after the cover is raised. The flexible enclosure can comprise a camper enclosure that encloses the truck bed and also optionally can extend beyond the truck bed to form additional sitting and sleeping rooms supported on separate portable tent-type posts and platforms. A flexible awning enclosure can be attached to the raised cover and lift frames to form an awning that extends beyond the truck bed supported on separate tent-type posts to provide a covered area for on-site work/commercial/recreational activities. An office enclosure can be attached to the raised cover and lift frames to form an office or meeting room where job-site work/meetings and the like can be conducted protected from the weather.

22 Claims, 12 Drawing Sheets

STOWABLE TRUCK BED ENCLOSURE

FIELD OF THE INVENTION

The present invention relates to a stowable truck bed enclosure that covers and extends about and optionally beyond the truck bed when raised.

BACKGROUND OF THE INVENTION

Pickup trucks have been provided with camper enclosures in the past in the form of prefabricated, self-contained rigid sheet metal camper inserts that are received in and fastened to the truck bed. These inserts are heavy and difficult to install and remove from the pickup truck bed. U.S. Pat. No. 3,145,044 describes a camper insert that includes foldable walls so that the camper insert can be lowered into the bed for storage and its weight reduced.

U.S. Pat. Nos. 3,286,414; 3,941,415; and 4,768,824 describe pickup truck bed covers that can be raised to provide an enclosure and lowered onto the truck bed. U.S. Pat. No. 3,286,414 employs telescoping corner posts to raise foldable walls attached to the top. U.S. Pat. No. 3,941,415 uses foldable side posts to raise the cover and aluminum side panels that are rolled out from under the cover to side panel positions to enclose the bed. U.S. Pat. No. 4,768,824 includes hinged, rigid side panels that are moved from a stowed horizontal position in the truck bed to an upright side panel position as the cover is raised.

SUMMARY OF THE INVENTION

The present invention provides a stowable enclosure for an open bed of a truck, such as a pickup truck, comprising a cover, such as for example only a fiberglass cover, that overlies the truck bed, first and second cover lift frames disposed on opposite sides of the truck body for raising and lowering the cover, and actuator means for the first and second lift frames to raise the cover to provide a support platform above the bed and to lower the cover to stow it on the truck body. Flexible enclosure means is connected to the cover and the lift frames to form an enclosure which may be of various configurations for desired end-use applications.

In an embodiment of the present invention, each cover lift frame includes respective first and second scissor linkages proximate the truck cab and optional first and second folding arm linkages proximate a rear end of the bed and fluid or other actuators for the linkages.

The cover and the associated lift frames include means for attaching a flexible enclosure thereto such that the flexible enclosure can be deployed about and optionally beyond the truck bed after the top or cover is raised. For example, the flexible enclosure can be connected to the cover and to the associated lift frames to form a camper enclosure that encloses the truck bed after the top is raised and also optionally can extend beyond the truck bed to form a sitting room behind the truck and sleeping rooms having floors supported on separate portable tent-type posts on opposite sides of the truck bed. In an alternative embodiment of the invention, a flexible awning enclosure can be attached to the cover and the lift frames to form an awning that extends from the raised cover beyond the truck bed and that is supported on separate tent-type posts at its periphery to provide a covered area for on-site work/commercial activities. In still another embodiment of the invention, a flexible office enclosure can be attached to the cover and the lift frames to form an office or meeting room on the truck bed where job-site work/meetings and the like can be conducted protected from the weather.

In a particular embodiment of the present invention, the top or cover is disposed on first and second lift frames each comprising an upper channel member and a lower channel member. The lower frame channel members are fixedly mounted on respective truck body side panels defining the opposite lateral sides of the truck bed. The stowable top or cover is mounted on the upper channels and interconnects them in a manner to unite the first and second lift frames as a unit. Each lift frame includes a scissor mechansism proximate the cab of the truck and a folding arm mechanism proximate the rear of the truck bed by which the top or cover is raised above the bed by suitable actuators, such a hydraulic, electrical or other actuators, operably associated with the scissor mechanisms and the folding arm mechanisms to deploy the cover.

The cover and the lift frames include means for attaching a selected flexible enclosure, such as the aforementioned camper enclosure, awning enclosure, office enclosure and the like, thereto. In a particular embodiment of the present invention, an attachment edge or strip of the flexible enclosure is received in a J-shaped peripheral channel on the cover and upper channels of the lift frames. After raising of the cover and lift frames, the flexible enclosure is connected to the raised cover for quick on-site deployment to a desired enclosure configuration.

Advantages and objects of the present invention will be better understood from the following detailed description of the invention taken with the following drawings.

DESCRIPTION OF THE INVENTION

Figure 1:
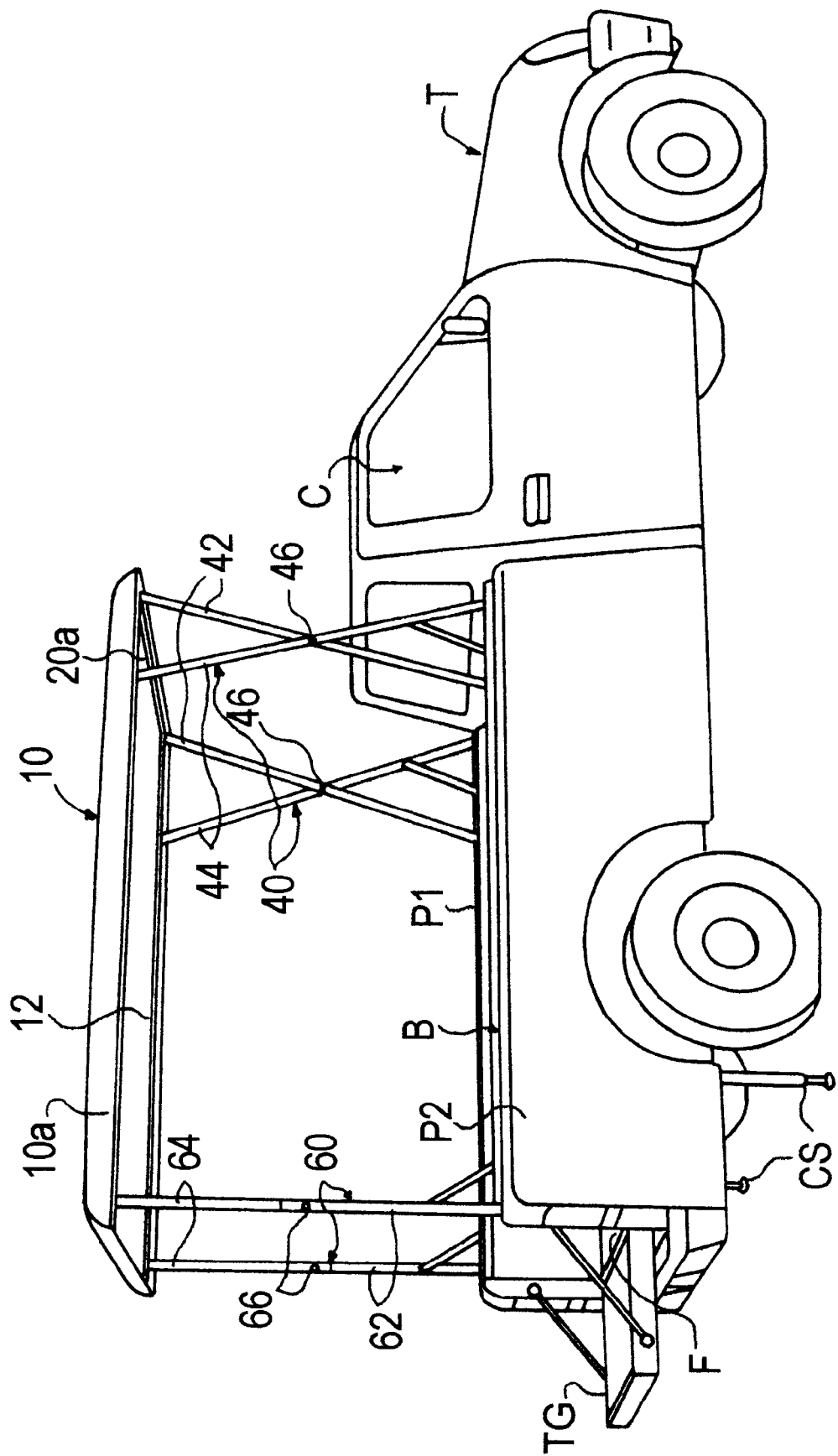
FIG. 1 is a schematic perspective view of a pickup truck with the cover in the raised position without a flexible enclosure connected thereto to show the lift frames extended for raising the top or cover.
Figure 2:
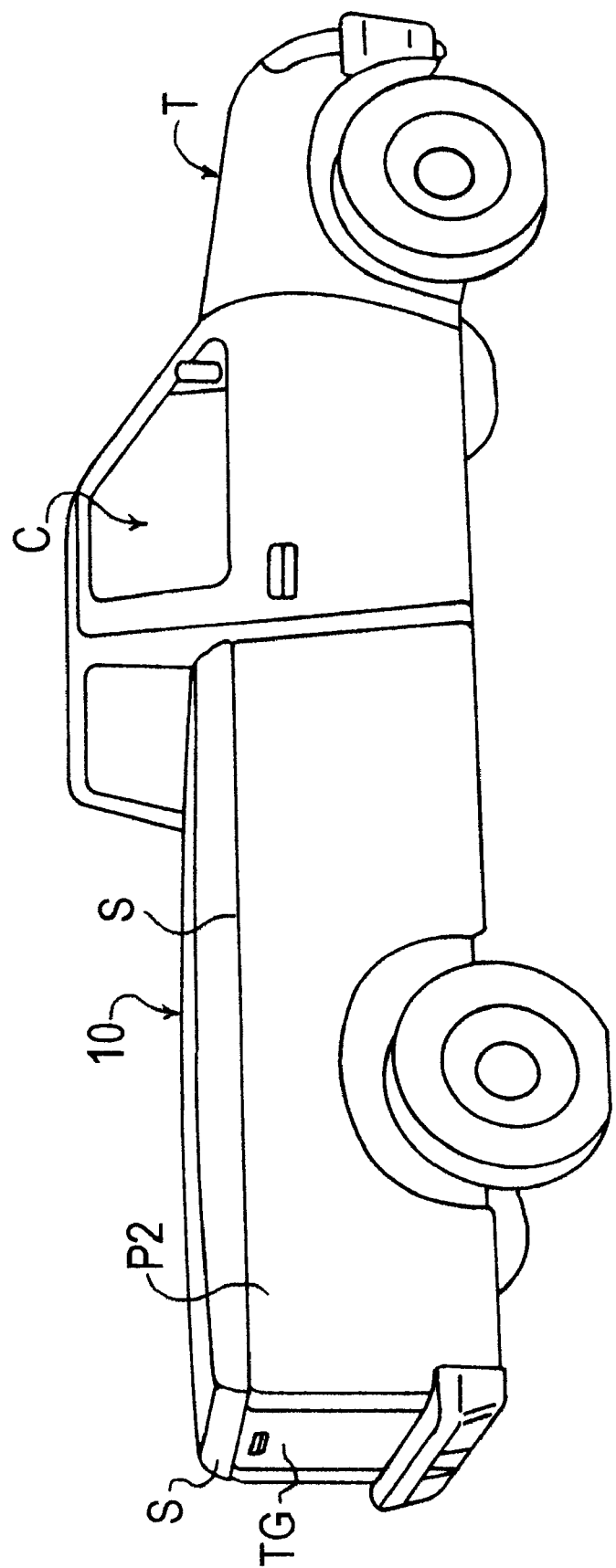
FIG. 2 is a schematic perspective view of the pickup truck of FIG. 1 with the cover in the stowed position on the truck bed.

The present invention provides in one embodiment a stowable top or cover 10 mounted on an open bed B of a truck T, such as a pickup truck shown somewhat schematically in FIGS. 1 and 2 for purposes of illustration and not limitation, in a manner to be raised to provide a support platform above the bed B and to be lowered to a stowed position enclosing the top of the bed B. The truck bed B is defined by a bed floor F, upstanding opposite body side panels P1, P2, a tailgate TG, and a front side panel FP of the truck bed adjacent the driver's cab C in conventional manner.

The top or cover 10 typically comprises a one-piece molded fiberglass reinforced plastic top or cover that is sized to overlie the top surfaces S of the side panels P1, P2, front panel FP, and tailgate TG that encompass the truck bed B so as to cover same when the top or cover 10 is in the lowered stowed position shown in FIG. 2. The top or cover 10 includes a downturned peripheral flange or lip 10a that overlies at least partially the top surfaces S of the upright truck body panels P1, P2, front panel FP, and tailgate TG when the tailgate TG is deployed upright to close the truck bed B in usual manner. The top or cover 10 can be made of other materials such as, for example only, sheet metal.

The stowable top or cover 10 is disposed on first and second expandible/collapsible lift frames F1, F2 mounted on the opposite side panels P1, P2. Each frame F1, F2 is identical and comprises an upper metal (e.g. extruded aluminum) or plastic channel member 12 and a lower metal or plastic channel member 14. Each upper channel member 12 includes a top wall 12a and a pair of depending side walls 12b defining a channel therebetween.

The lower channel members 14 include a bottom wall 14a and a pair of upstanding side walls 14b defining a channel therebetween. The lower channel members 14 are fixedly disposed or mounted adjacent the upright truck body panels P1, P2 with a lateral flange 14c on the top surfaces S of the upright truck body panels P1, P2 using a pair of fasteners 48, 68, such as ⅜ inch bolts and mating nuts, spaced apart along the length of each channel 14. An L-shaped bracket BR is fastened by bolt 48 to the inner wall 14b of each lower channel 14 and is bolted to the front panel FP to stablize the channels 14 and scissor arms. The stowable top or cover 10 is mounted on the upper channel members 12 and interconnects them in a manner to unite the first and second lift frames F1, F2 as a unit at the top channel members. In particular, the top or cover 10 includes lugs 10b, one shown in FIG. 5, molded or otherwise formed on the inner side of the top 10 proximate the corners thereof. Each lug 10b receives a threaded stud 16 that extends through respective openings 12c in the walls 12a of each upper channel member 12. A threaded nut 18 is threaded onto each stud 16 with a washer adjacent the cover, FIG. 5, in a manner to fasten the top or cover 10 to upper channel members.

Figure 3:
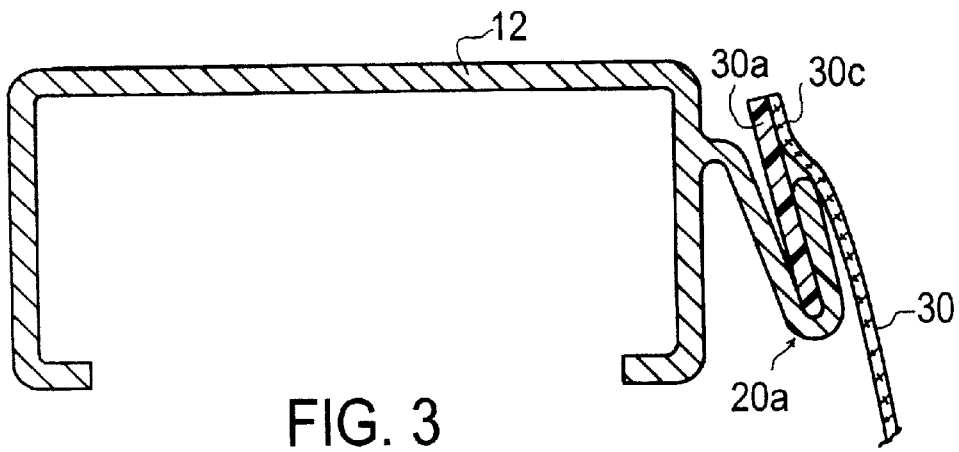
FIG. 3 is a partial sectional view of the channel showing a J-shaped channel thereon.
Figure 5:
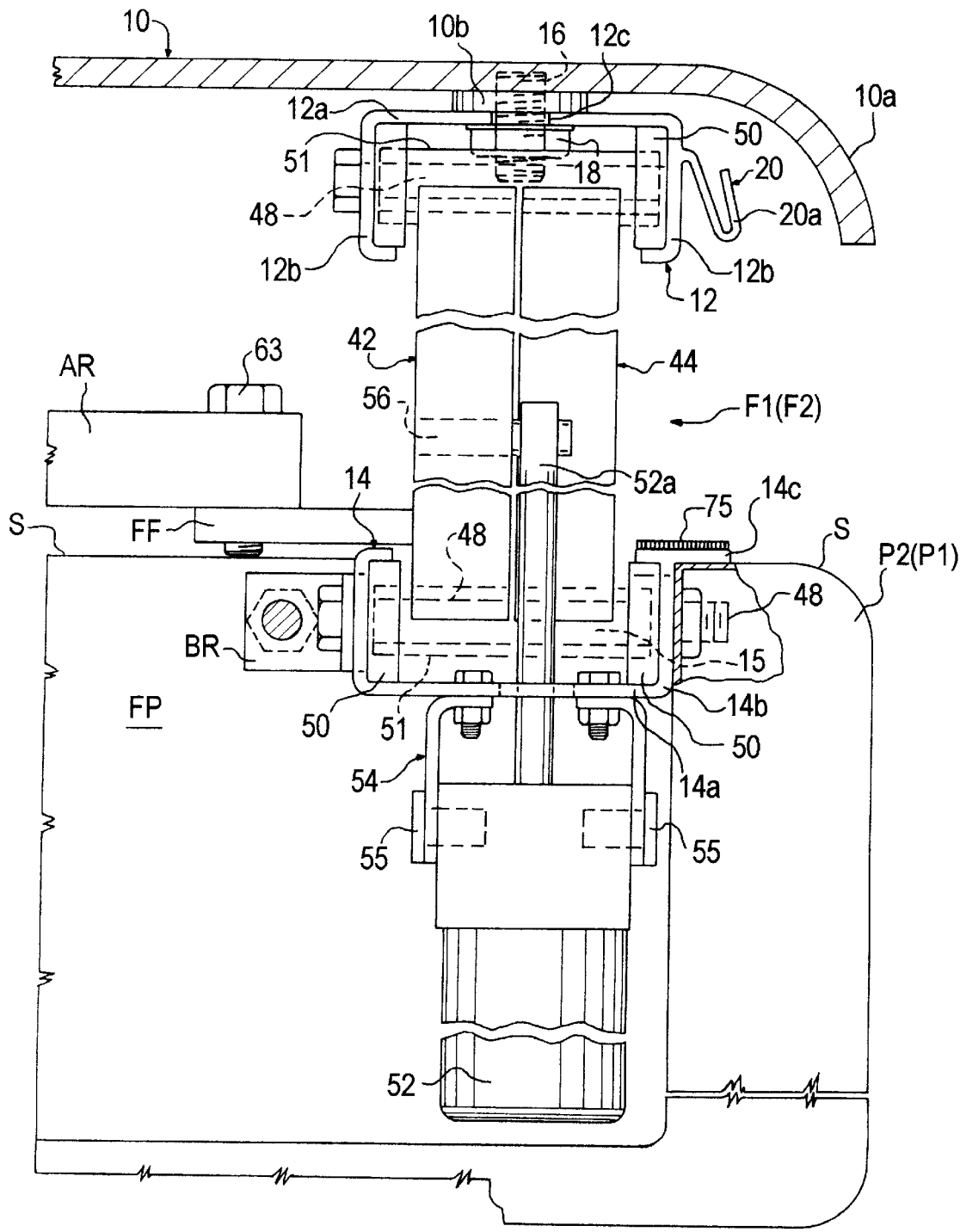
FIG. 5 is an enlarged partial elevational view of the lift frame at the scissor mechanism looking forward toward the truck cab.

Each upper channel member 12 includes on the outer side wall 12b thereof means 20 for attaching a flexible enclosure means 30 to be described herebelow. In FIGS. 3 and 5, such attaching means 20 is illustrated as comprising an integral J-shaped channel 20a for receiving and holding an outermost reinforced edge or strip 30a of the flexible enclosure member 30. The front and rear end lips 10a of the top or cover 10 include similar J-shaped channels 20a, FIG. 3A, that are registered laterally with the J-shaped channels 20a on the upper channel members 12 so that the enclosure means 30 is attached about the periphery of the top or cover 10. Small gaps between the channels 20a disposed on the upper channel members 12 and on the cover 10 at the corners thereof are filled by respective corner flaps sewn or otherwise connected to the enclosure means 30 and folded into the adjacent channel 20a of the cover or upper channel member to fill and close off the gaps. The J-shaped channels 20a are fastened on the end lips 10a of the cover 10 by an adhesive bond joint or other fastening means.

Each lift frame F1, F2 includes a scissor lift mechansism 40 proximate the driver's cab C of the truck T and a folding arm lift mechanism 60 proximate the rear of the truck bed B by which the top or cover 10 is raised above the truck bed. Each scissor mechanism 40 includes a pair of flat-walled tubular metal arms 42, 44 pivotally connected at their centers by a pivot pin 46. Each scissor arm 42 includes an upper end pivotally connected to the upper channel member 14 by a pivot bolt 48, such as a ⅜ inch bolt and mating nut (not shown) adjacent wall 12b, and a lower end having a pair of rollers 50 on axle 51 such that the rollers ride in the respective lower channel member 14. Each scissor arm 44 includes a lower end pivotally connected to the lower channel member 14 by pivot bolt 48, such as a ⅜ inch bolt and mating nut, used to attach each lower channel 14 to the truck body panels P1, P2 and an upper end having a pair of rollers 50 on axle 51 such that the rollers ride in the upper channel member 12 as the scissor mechanism is expanded to raise the cover 10 or contracted to lower the cover 10.

Between the scissor mechanism 40 is a flat-walled (square) tubular torque arm AR extending between the arms 42 of the frames F1, F2 to maintain a horizontal orientation of the top 10 as it is raised and lowered. Typically, a single torque arm AR is provided between arms 42 to this end. The torque arm AR is attached to each arm 42 by identical joints each comprising a fastener 63, such as a ⅜ inch bolt, joining the end of each torque arm to a lateral, inwardly extending flange FF welded to each arm 42, FIG. 5, one fastener 63 and flange FF being shown and the other joint being identical.

Each scissor mechanism includes a hydraulic or other fluid cylinder 52 pivotally fastened to the lower channel member 14 by a bracket 54 and pivot pins 55. Each cylinder includes a cylinder rod 52a that is pivotally connected to the arm 44 by a pin 56. Each cylinder 52 is mounted on the bracket 54 so as to reside within the truck bed B proximate a respective opposite body side panel P1, P2.

Each folding arm mechanism 60 includes a pair of flat-walled tubular metal arms 62, 64 pivotally connected at their adjacent side-by-side ends 62a, 64a by a pin 66. Each arm 62 includes a lower end pivotally connected to the lower channel member 14 by pivot bolt 68, such as a ⅜ inch bolt and nut, used to fasten each channel 14 to the truck body side panel. Each arm 64 includes an upper end pivotally connected to the upper channel member 12 by a similar pivot bolt 68 and mating nut.

Each folding arm mechanism also includes a hydraulic or other fluid cylinder 72 pivotally fastened to the lower channel member 14 by a bracket 74. Each cylinder includes a cylinder rod 72a that is pivotally connected to the lower arm 62 by a pin 76. The cylinders 72 are mounted on the bracket 74 so as to reside within the truck bed B proximate a respective opposite body side panel.

Figure 10:
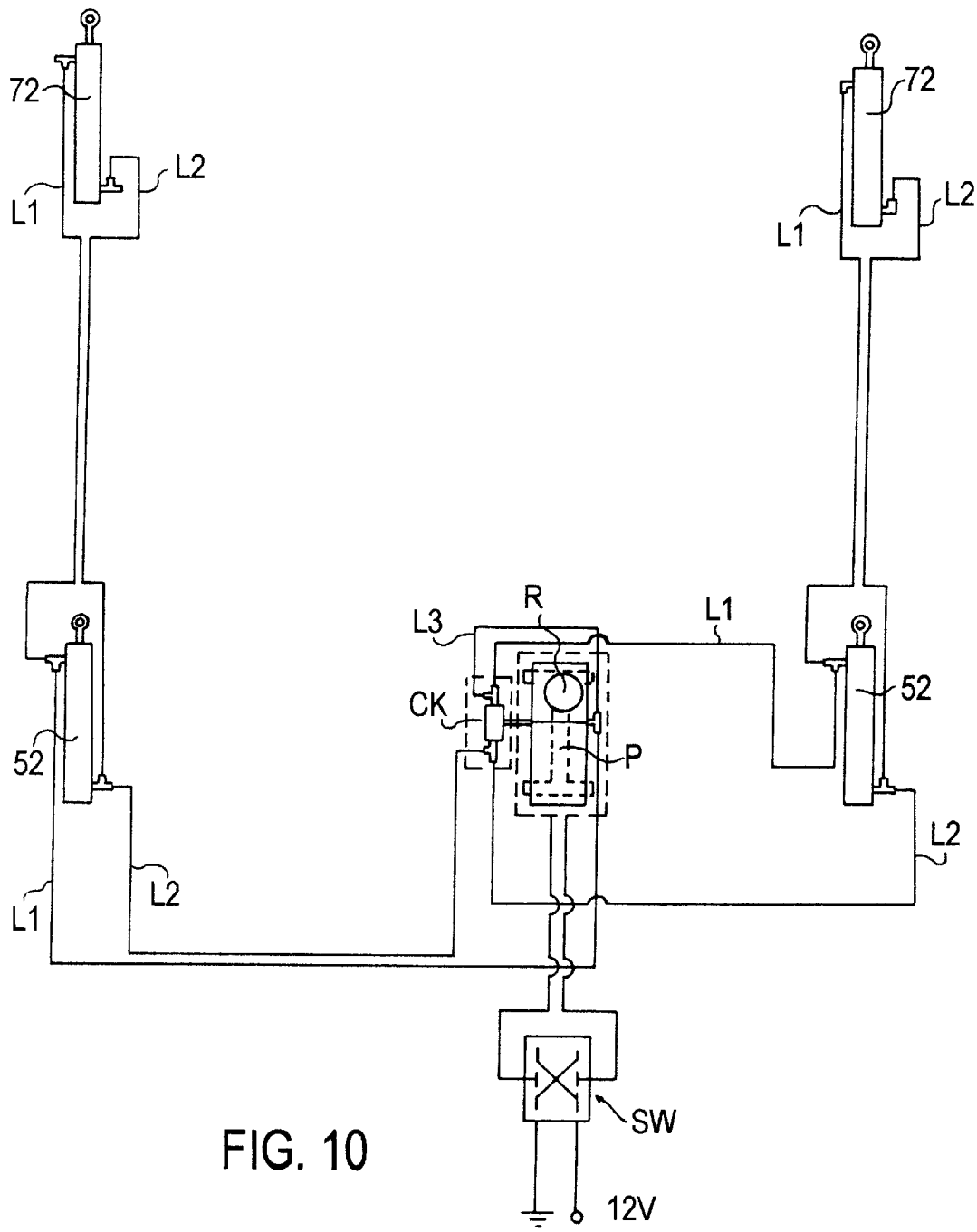
FIG. 10 is a schematic diagram of the hydraulic circuit for controlling the fluid cylinders.

The hydraulic cylinders 52, 72 can be connected to a common or separate source of hydraulic pressure. For example, as illustrated schematically in FIG. 10, a common source of pressurized hydraulic fluid (e.g. hydraulic pump P having hydraulic fluid reservoir R) is connected to the front and rear right side dual-acting cylinders 52, 72 and to front and rear left side dual-acting cylinders 52, 72 by supply (advance) hydraulic lines L1 and by supply (retract) hydraulic lines L2. A pump output check valve CK is disposed in the supply lines L1, L2. A pump crossover line L3 is provided to relieve the check valve. The pump P can be commercially available model SYO-8000600 pump available from Power Packer, Butler, Wisconsin, and is actuated by a conventional double pole, double throw center-off switch SW connected to the truck ground and 12V battery voltage as shown. As mentioned, the switch SW can be located in the truck cab or elsewhere on the truck.

Figure 12A:
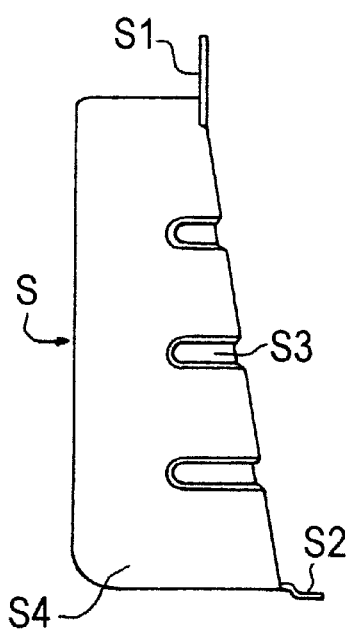
FIGS. 12A, 12B, 12C are respective side elevational, front elevational and plan views of a plastic shield.
Figure 12B:
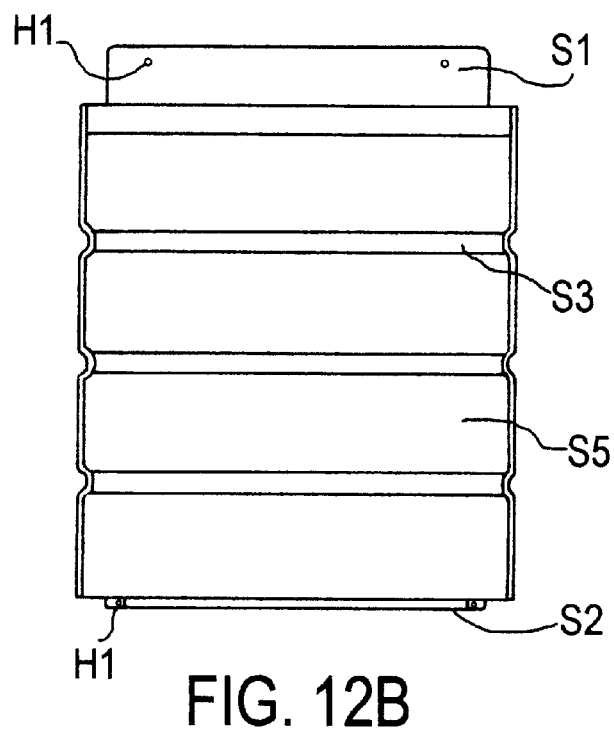
Figure 12C:
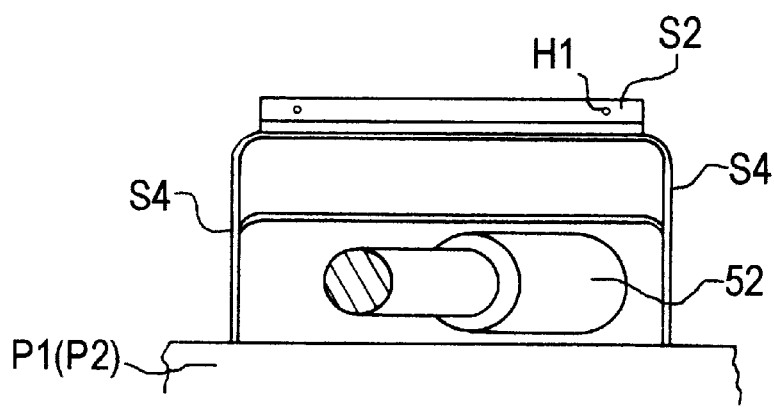

The hydraulic circuit is controlled by an electrical switch SW disposed in the truck cab C or elsewhere on the truck to turn on the hydraulic pump P to move the cylinder rods 52a, 72a in directions to expand the mechanisms 40, 60 and thereby raise the top or cover 10. The cover 10 is lowered by reversing movement of the cylinder rods 52a, 72a in directions to contract the mechanisms 40, 60 and thereby lower the top or cover 10. The pump P is mounted on a front driver's side corner of truck bed B and the hydraulic lines to cylinders 52, 72 extend from the pump underneath the lower channels 14 and across the truck bed underneath the torque arm AR to the cylinders. The pump P and proximate front cylinder 52 are protected by a vacuum molded plastic (or metal) three-sided shield S shown in FIGS. 12A, 12B, 12C attached to the lower channel 14 via upper vertical shield flange S1 and to the truck bed B via lower generally horizontal shield flange S2 using self-tapping fasteners (not shown), such as ½ inch screws, extending through holes H1. The shields are atttached with the open back of the shield adjacent the truck bed panel P1 or P2 and open top facing upward to allow the cylinder rods to extend therethrough. The shield is molded to include horizontal concave reinforcing regions S3 that extend from one shield side wall S4 across the shield front wall S5 to the other side wall S4. The rear edges of the sidewalls S4 are molded to match the contour of the truck bed panels P1, P2. The other front cylinder 52 and rear cylinders 72 each are protected by a respective plastic or metal shield (not shown) of similar type. The shield S can be molded or made with shapes other than that illustrated.

Figure 11:
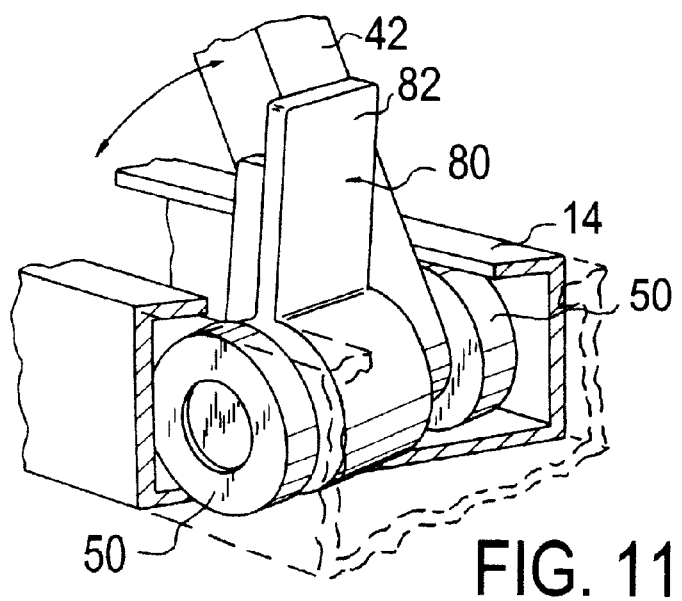
FIG. 11 is a perspective view of a cam lock disposed adjacent a roller of a movable scissor arm to engage the bottom of the channel in a manner to lock the scissor mechanism in a raised position.

When the cover 10 is raised by the cylinders 52, 72, the cover 10 will remain in the raised position as a result of the scissor mechanism 40 and folding arm mechanism 60 being fully deployed. The pump P thus can be is deactuated at this time. Each arm 42 includes a molded plastic cam lock 80 mounted on the lower axle 51 adjacent an inner lower roller 50, FIG. 11. Once the cover 10 is deployed or raised, the cam locks 80 are rotated manually by finger tabs 82 to frictionally engage the bottom walls of the lower channels 14 in a manner to prevent movement of the arms 42. The cam locks 80 are released prior to lowering the cover by rotating them in the opposite directions out of frictional engagement with the lower walls of the channels 14.

In lieu of fluid cyclinders 52, 72, electrical or other conventional actuators (not shown) can be used to raise and lower the scissor lift mechanism 40 and folding arm lift mechanism 60. Electrical actuators may be used with conventional screw drive mechanisms connected to the mechanisms 40, 60 to this end.

Figure 3A:
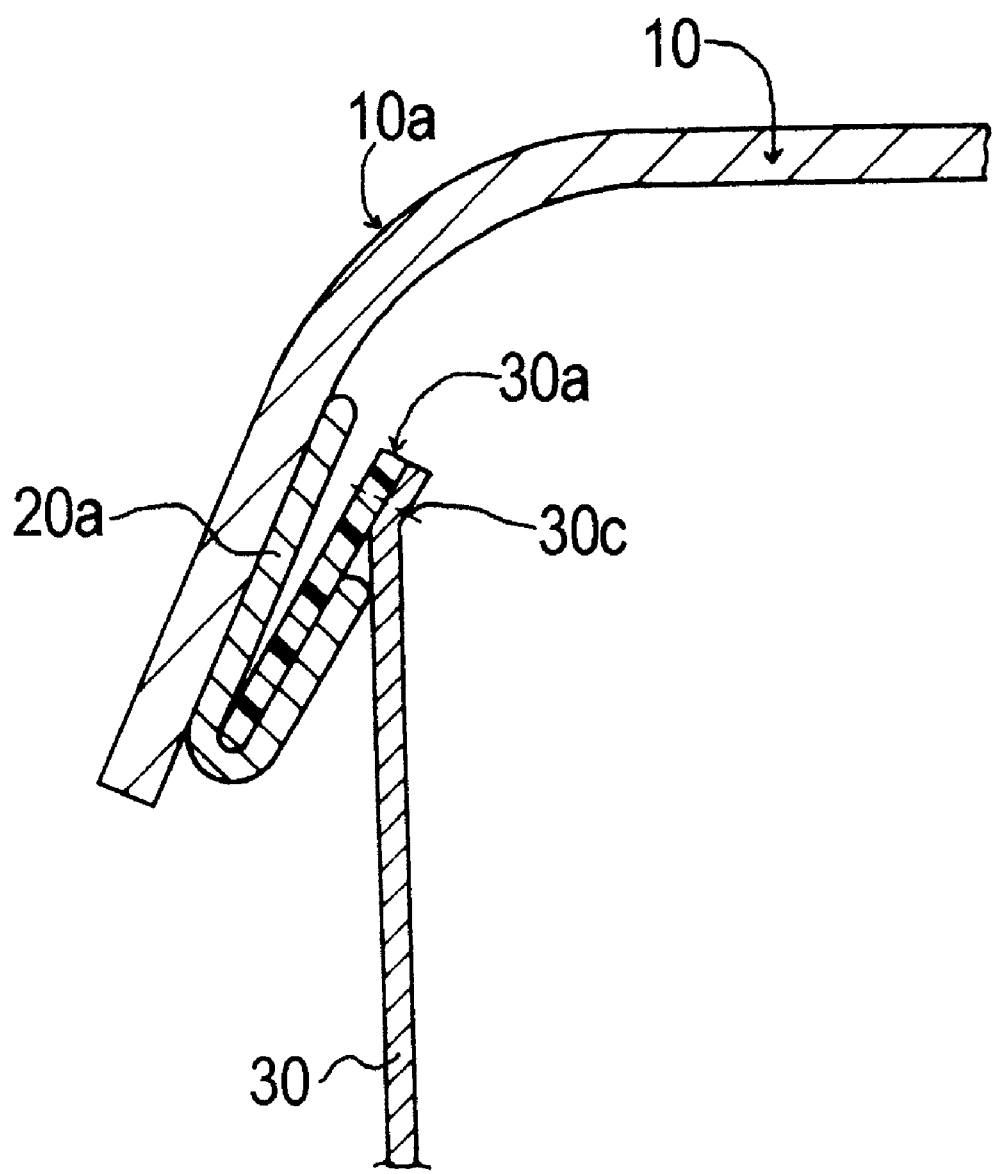
FIG. 3A is a partial sectional view of the cover showing a J-shaped channel mounted on an end lip thereof.
Figure 4:
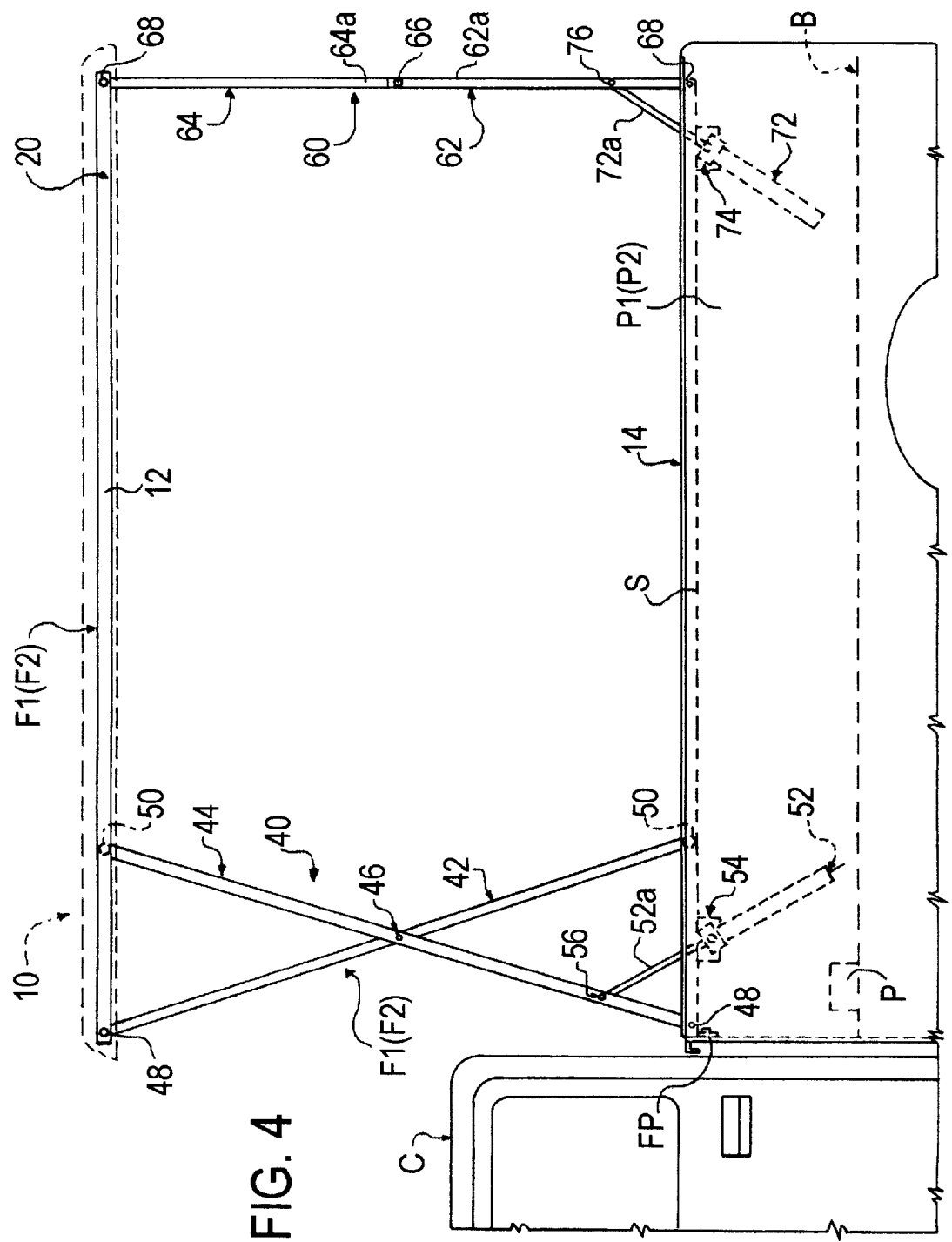
FIG. 4 is a side elevation of one of the cover lift frames mounted on the truck body side panel with the lift frame in the extended position to raise the cover, the other frame being identical to that shown and disposed on the opposite side panel of the truck.

As mentioned above, the cover 10 and the upper channel members 12 include means 20, FIGS. 3, 3A and 5, for attaching a selected flexible enclosure means 30 thereto when the cover 10 is fully raised. In the embodiment of the invention shown for illustration purposes, the particular flexible enclosure 30 selected for use will include a plastic reinforcment edge or strip 30a that is sewn to the enclosure 30 by sew line 30c and received and held in the J-shaped channels 20a on the cover 10 and the upper lift frame channels 12a. Prior to lowering the cover 10 to the stowed position, the flexible enclosure 30 is removed from the cover 10 and folded for storage in the truck bed B beneath the cover 10, in the stowed position, FIG. 2, of the cover.

Figure 7:
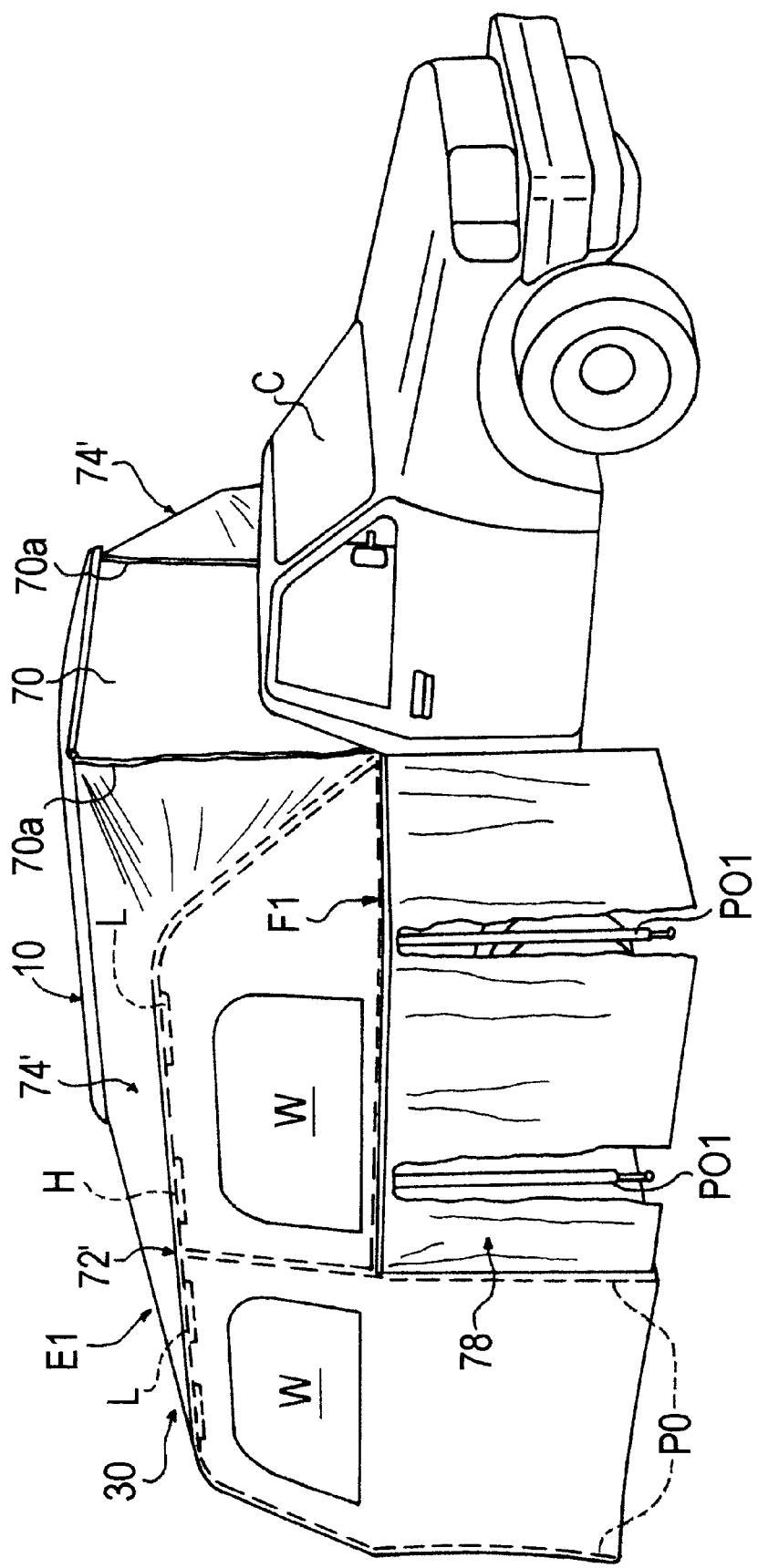
FIG. 7 is a schematic perspective view of a pickup truck with the cover in the raised position with a camper enclosure deployed.

Referring to FIG. 7, a pickup truck is shown with the cover 10 in the raised position and with a flexible tent-like camper enclosure E1 attached. The camper enclosure E1 includes a front flap 70 disposed behind the truck cab C, a tent-like sitting room 72' located behind the truck bed B, and a pair of tent-like sleeping rooms 74' cantilvered over the opposite side panels P1, P2 of the the truck. The various walls of the flexible enclosure E1 thereby enclose the truck bed B. The tailgate TG typically is placed in the horizontal position for the camping enclosure E1. The truck can be provided with conventional undercarriage chasis supports CS, FIG. 1, such as threaded telescoping supports, that are lowered when camping to provide support and stablity of the truck bed B.

The front flap 70 may be integral with the enclosure walls forming the sitting room 72' and sleeping rooms 74', or it may be a separate panel therefrom and connected thereto by zipper, Velcro (hook and loop) fastener or connector strips 70a at final deployment of the enclosure. Small gaps between the laterally registered channels 20a on the upper channel members 12 and the cover 10 at the corners thereof are filled by respective lateral corner flaps sewn or otherwise connected proximate the corners of front flaps 70 or of adjacent enclosure walls and are folded into the adjacent channel 20a of the cover or upper channel member to fill and close off the gaps.

The flexible camper enclosure E1 typically can comprise flexible waterproofed canvas, flexible plastic material, and the like tent-like material with optional screen windows W present and located as desired at the sitting room 72' and sleeping rooms 74' and a door (not shown) located at the sitting room 72'. For example, a tentlike door flap (not shownbut similar to the door of FIG. 9A) can be provided at the sitting room 72' for entry or access thereto and to the sleeping rooms 74' and the enclosed truck bed B.

Figure 6:
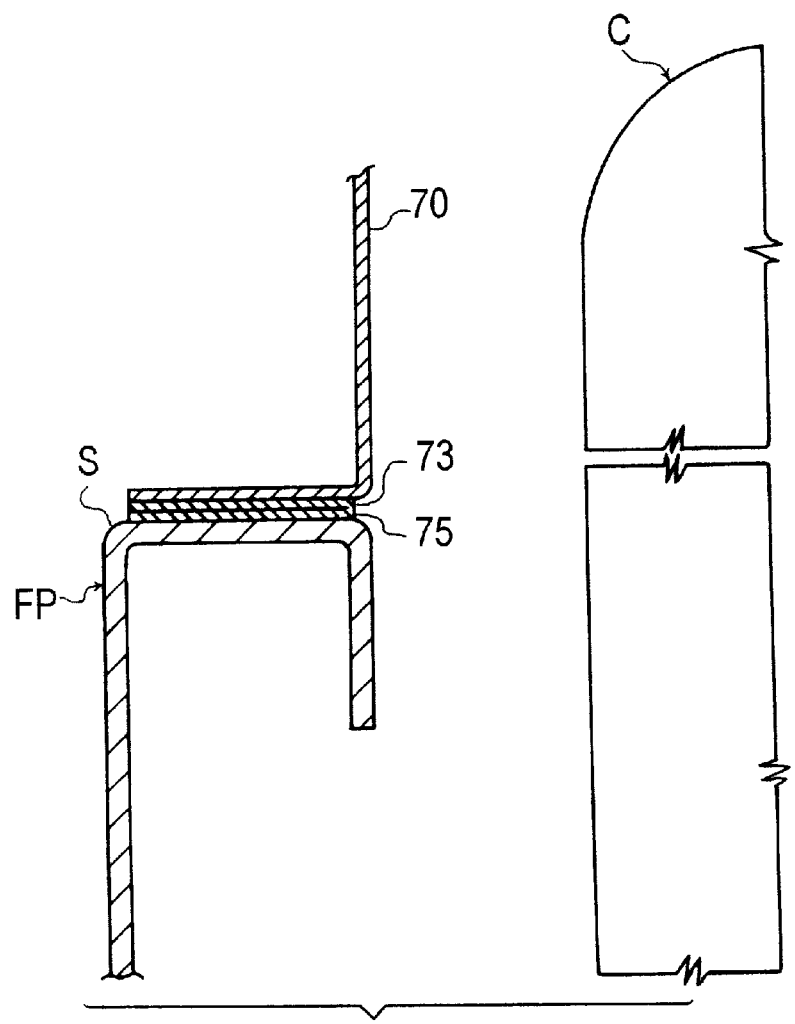
FIG. 6 is a partial sectional view of the truck bed having a hook and loop attachment fastened on a top of the front side wall of the truck bed.

In deployment of the flexible camper enclosure E1, the cover 10 is raised by actuation the cylinders 52, 72 to the fully raised position shown in FIG. 7 to allow connection of the enclosure to cover 10 by placing strips 30a in channels 20a. The lower end of the front flap 70 includes a Velcro (hook and loop) fastener 73 that engages and connects to a similar Velcro fastener 75 adhered by conventional pressure sensitive adhesive to the top surface of the front panel FP, FIG. 6. Also, at this time, tent-like tubular aluminum or other posts PO and tubular hoops H are inserted inside the sitting room 72' and sleeping rooms 74' and joined together in a manner similar to deployment of a conventional tent to form their shapes when the cover 10 is fully raised. The posts PO and hoops H are received and held in position in tent-like loops L sewn or otherwise attached at appropriate locations in the sitting room 72' and sleeping rooms 74' to this end in the same manner as conventional tent construction.

Each floor F1 of the cantilvered sleeping rooms 74' is formed by a 4 by 8 feet plywood or other floor member supported by a pair of exterior support posts PO1. The space below each sleeping room 74' optionally can be enclosed by a canvas or plastic curtain 78 hung from the enclosure E1 using Velcro (hook and loop) fasteners. The curtains 78 provide a protected storage space or compartment below the sleeping rooms 74 where equipment, food and other material can be stored and protected from weather.

Once the front flap 70 is secured to the truck body and the posts PO, PO1, hoops H and floors F1 are positioned, the tightened enclosure configuration is retained by the scissor and folding arm mechanisms 40, 60. Elastic cords (not shown) can be provided to extend through enclosure loops similar to loops L yet arranged about the periphery of the enclosure at the underside of each floor F1 with each cord having exposed ends that can be manually drawn tight to tighten the tent-like material at the floor periphery.

Stowing of the camper enclosure E1 occurs in the reverse sequence from the deployment sequence described above. After the posts PO, PO1, hoops H, and floors E1 are removed from the enclosure E1, the enclosure is removed and stored with the other removed components on the truck bed B beneath the stowed top 10.

Figure 8:
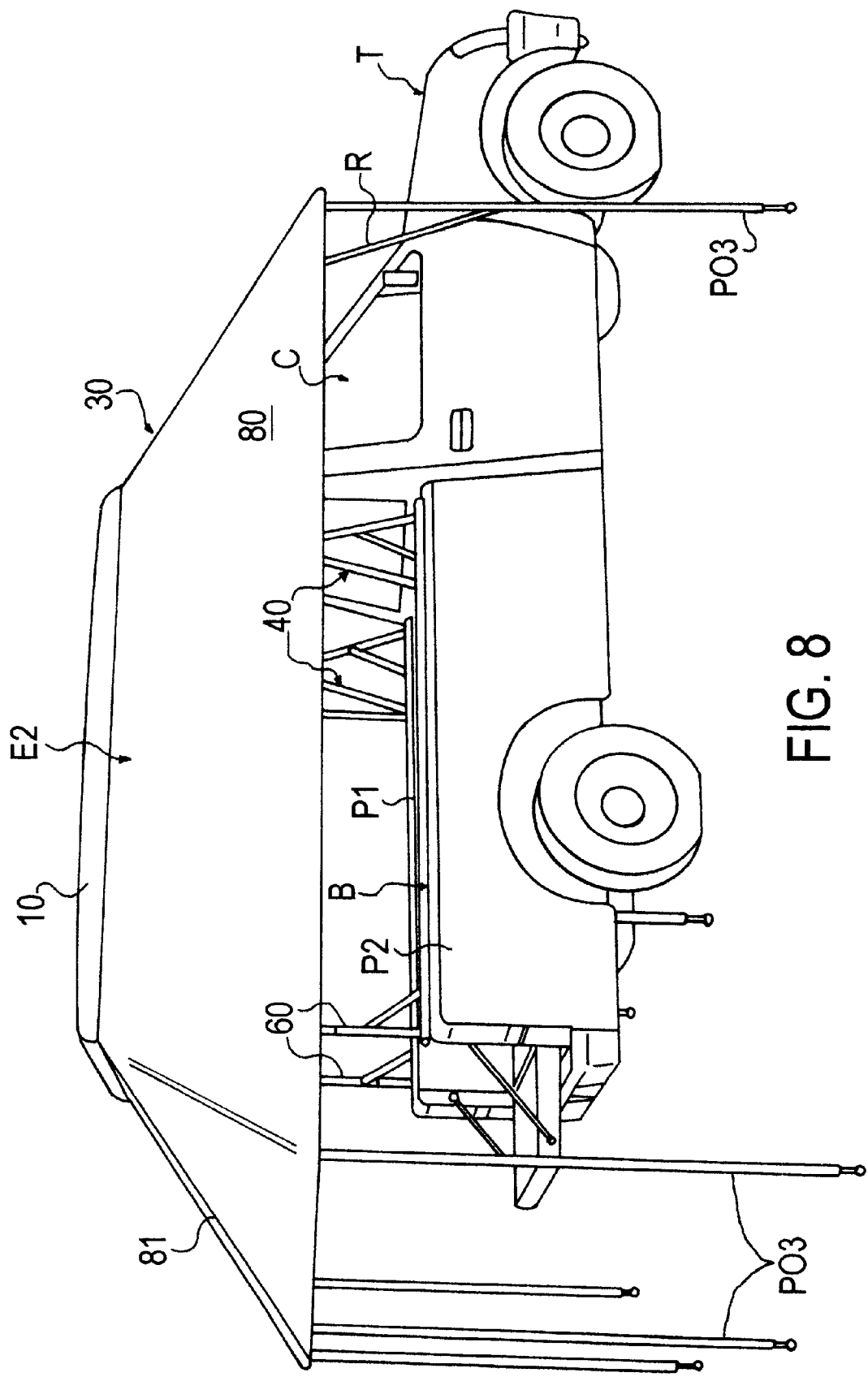
FIG. 8 is a schematic perspective view of a pickup truck with the cover in raised position with an overhead awning enclosure deployed.

Referring to FIG. 8, a pickup truck is shown with the cover 10 in raised position and with a flexible awning enclosure E2 fully deployed. The awning enclosure E2 includes a peripheral overhead canvas or plastic roof flap 80 extending outwardly beyond the truck bed periphery to provide a covered area for use. The outer peripheral sides of the awning flap 80 are supported by a plurality of tent-like upright posts PO3. The awning enclosure can be a one-piece or multi-piece awning with sections connected together by connectors such as a Velcro connectors. In FIG. 8, a zipper connector 81 is provided to connect opposite ends of the awning after deployment. The awning enclosure E2 provides an overhead protected area for on-site work or commerical activities, such as construction jobs, marketing stalls, and recreational purposes.

In deployment of the flexible awning enclosure E2, the top 10 is raised by actuation the cylinders 52, 72 to the fully raised position shown in FIG. 8. The support posts PO3 then are placed in position to support the awning periphery. The posts PO3 can be connected by ropes, cords or cables R (one shown) to tabs (not shown) on the awning and/or to stakes (not shown) in the ground to help stablize the deployed awning in similar manner as conventional awning tent deployment.

Figure 9:
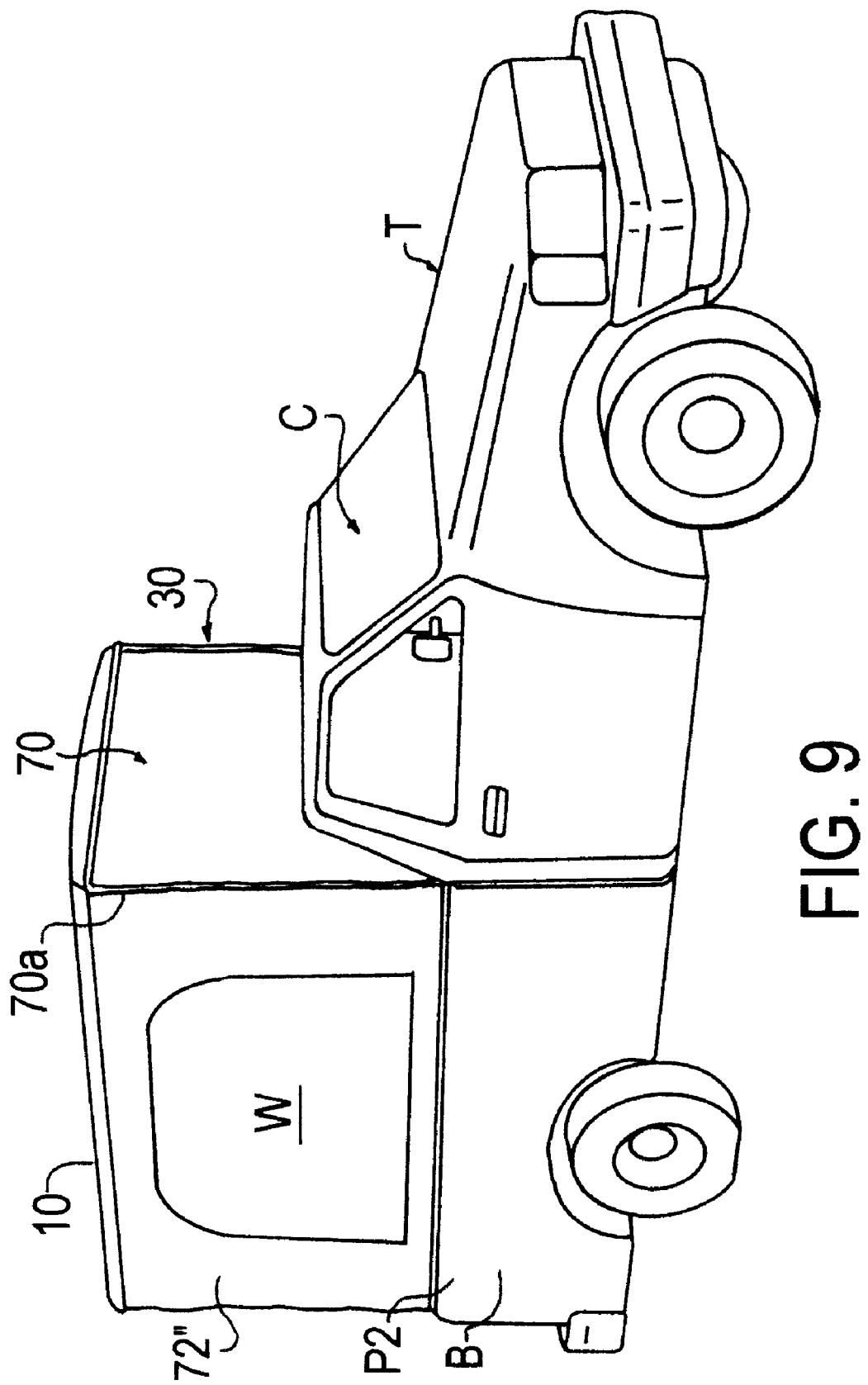
FIG. 9 is a schematic perspective view of a pickup truck with the cover in raised position with an office enclosure deployed.
Figure 9A:
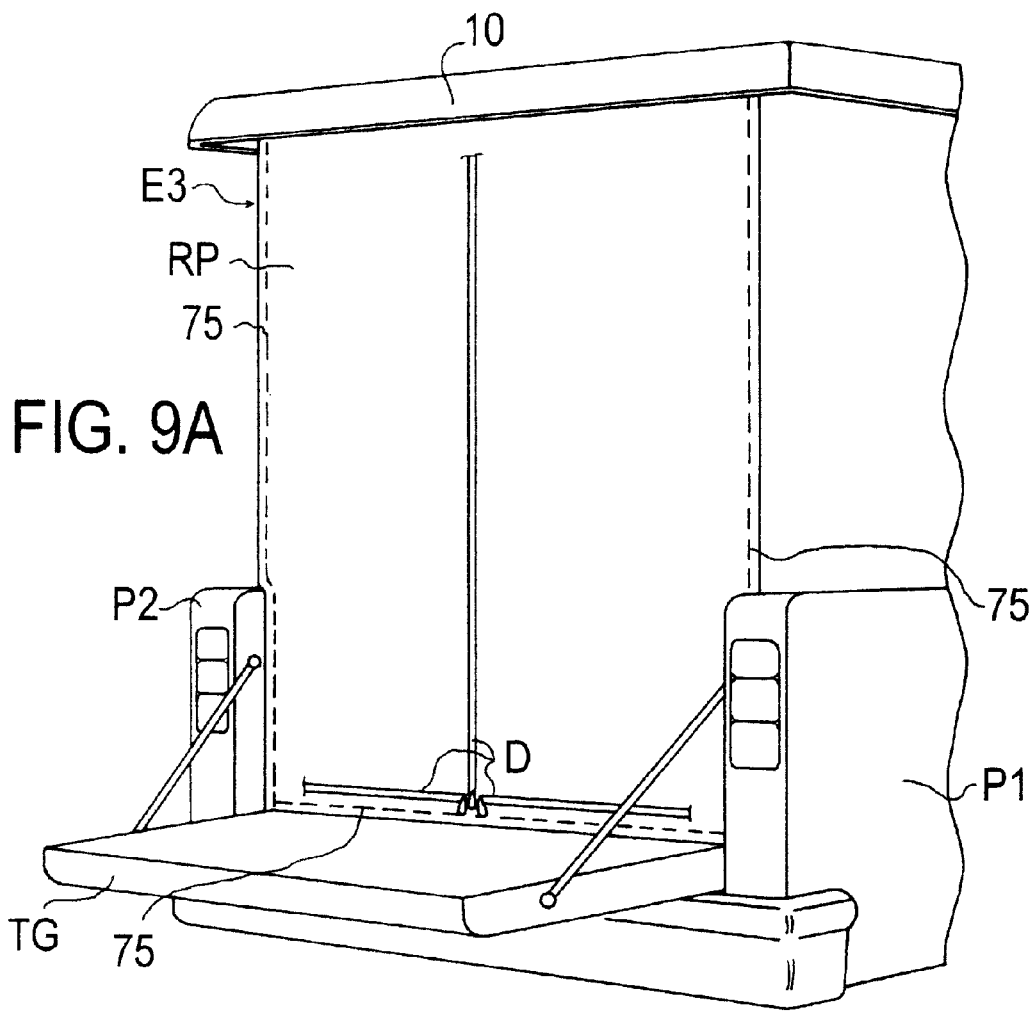
FIG. 9A is a rear elevation of the office enclosure on the truck bed.

Referring to FIG. 9, a pickup truck is shown with the top 10 in raised position and with a flexible office enclosure E3 fully deployed. The office enclosure E3 includes flexible front panel 70 and side panels 72" (one shown) that are secured at their lower edges to the top surfaces of the side panels and front panel using Velcro (hook and loop) fasteners in a manner shown in FIG. 6 (in the same manner decribed above for front panel 70). The rear panel RP extends down the rear of the truck bed B with the tail gate in the horizontal position, FIG. 9A, and the upright and lower edges of the rear panel RP are attached to the side panels and the truck bed B using Velcro (hook and loop) fasteners 75 in a manner shown in FIG. 6. The side panels can include screen windows W, while the rear panel can include a zippered door flap D to provide access to the protected office room enclosed about the truck bed B by the panels. The office enclosure E3 provides a protected office area for job-site work or a job-site meeting room.

In deployment of the flexible office enclosure E3, the cover 10 is raised by actuation the cylinders 52, 72' to the fully raised position shown in FIG. 9. The upper edges or strips of the front panel and side panels then are attached to J-shaped channels, and the lower edges of the flexible enclosure are attached to the front and side panels and truck bed using the fasteners as explained above. The front, side and rear panels of the office enclosure E3 of FIG. 9 can be formed intergrally with one another, or they may be separate panels joined at the corners by Velcro, zipper or other suitable connectors after deployment of the office enclosure.

In the practice of the present invention, the rear folding arm lift mechanisms 60 and cylinders 72 may be omitted for short truck beds where the scissor lift mechanisms 40 are sufficient to raise, lower and support the cover 10. While the invention has been described in terms of specific embodiments thereof, it is not intended to be limited thereto but rather only to the extent set forth in the following claims.

What is claimed is:

1. Enclosure for a bed of a pickup truck, comprising a cover that overlies the truck bed, first and second lift frames disposed on respective first and second opposite side panels of said pickup truck with said frames connected to said cover, said lift frames each including first and second arms that are pivotally connected to form an X-shaped scissor linkage and that are disposed between said cover and a respective one of the side panels, actuator means connected to each of said first and second lift frames and controllable by an operator to raise the cover above the truck bed and to lower the cover to stow it, each actuator means residing within the truck bed proximate a respective one of the side panels and oriented at an upward angle relative to horizontal, and flexible enclosure means connected to the raised cover.

2. The enclosure of claim 1 further including first and second folding arm linkages proximate a rear end of said bed, each said folding arm linkage including a pair of arms pivotally connected between their ends.

3. The enclosure of claim 2 including an actuator connected to each scissor linkage and to each folding arm linkage, each said actuator being disposed above the truck bed proximate the side panels.

4. The enclosure of claim 1 wherein said cover and said lift frames include channel means for receiving said flexible enclosure.

5. The enclosure of claim 4 wherein said channel means comprises a J-shaped channel on said cover and said lift frames to receive and hold a peripheral edge of said enclosure means.

6. The enclosure of claim 1 wherein said flexible enclosure means comprises flexible canvas or plastic material.

7. The enclosure of claim 1 wherein the flexible enclosure means is stowed in the truck bed when the cover is stowed.

8. The enclosure of claim 1 wherein said flexible enclosure means comprises a camper enclosure that encloses the truck bed when the top is raised and also extends beyond the truck bed behind the truck bed to form a sitting room and laterally of the side panels to form a sleeping room with an above ground floor when the cover is raised.

9. Enclosure for a bed of a pickup truck, comprising a cover that overlies the truck bed, first and second lift frames disposed on respective first and second opposite side panels of said pickup truck with said lift frames interconnected by said cover, said lift frames each including first and second arms that are pivotally connected to form an X-shaped scissor linkage and that are disposed between said cover and a respective one of the first and second opposite side panels, actuator means for each of the first and second lift frames to raise the cover above the truck bed and to lower the cover to stow it, each actuator means residing within the truck bed proximate a respective one of the first and second opposite side panels and oriented at an upward angle relative to horizontal, and flexible enclosure means connected to the raised cover, said enclosure means comprising a camper enclosure that encloses said truck bed when the cover is raised and also extends beyond said truck bed behind said truck bed to form a sitting room and laterally of said side panels to form a sleeping room when the cover is raised.

10. The enclosure of claim 9 wherein the sitting room includes support post means therein.

11. The enclosure of claim 10 further including an upright curtain for enclosing a space below the floor for storage.

12. The connected to the cover and of claim 1 wherein said flexible enclosure means includes an awning enclosure having an overhead awning that extends beyond the periphery of said truck bed and post means positioned on the ground to support the periphery of said awning when the cover is raised.

13. The enclosure of claim 1 wherein said flexible enclosure means includes an office enclosure that encloses the truck bed when the top is raised.

14. The enclosure of claim 1 wherein said first arm and second arm of each lift frame are disposed between upper and lower lift frame members and include respective ends having a roller that rolls on a respective one of the upper and lower lift frame members.

15. The enclosure of claim 14 further including a cam lock associated with each roller that rolls on a respective one of the lower lift frame members and operable to lock against said respective one of the lower lift frame members.

16. Enclosure for a bed of a pickup truck, comprising a cover that overlies the truck bed, first and second lift frames disposed on respective first and second opposite side panels of said pickup truck proximate a forward end of said bed with said lift frames connected to said cover, first and second folding arm linkages disposed on the respective first and second opposite side panels proximate a rear end of said bed and connected to said cover, said lift frames each including first and second arms that are pivotally connected to form an X-shaped scissor linkage and that are disposed between said cover and a respective one of the first and second opposite side panels, actuator means connected to each of the first and second lift frames and to each of the first and second folding arm linkages to raise the cover above the truck bed and to lower the cover to slow it, each actuator means residing within the truck bed proximate a respective one of the first and second opposite side panels and oriented at an upward angle relative to horizontal, and flexible enclosure means connected to the raised cover.

17. Enclosure for a bed of a pickup truck, comprising a cover that overlies the truck bed, first and second lift frames disposed on respective first and second opposite side panels of said pickup truck with said lift frames interconnected by said cover, said lift frames each including first and second arms that are pivotally connected to form an X-shaped scissor linkage and that are disposed between upper and lower lift frame members disposed on said cover and a respective one of the first and second opposite side panels, said first and second arms including a respective roller that rolls on a respective one of said upper and lower lift frame members, actuator means for each of the first and second lift frames to raise the cover above the truck bed and to lower the cover to stow it each actuator means residing within the truck bed proximate a respective one of the first and second opposite side panels and oriented at an upward angle relative to horizontal, and flexible enclosure means connected to the raised cover.

18. The enclosure of claim 1 including electrical switch means on said pickup truck for controlling said actuator means.

19. The enclosure of claim 18 wherein said electrical switch means controls a fluid pump.

20. Enclosure for a bed of a pickup truck, comprising a cover that overlies the truck bed, first and second lift frames disposed on respective first and second opposite side panels of said pickup truck with said lift frames connected to said cover, said lift frames each including first and second arms that are pivotally connected to form an X-shaped scissor linkage and that are disposed between said cover and a respective first and second lower lift frame member affixed on a respective one of the first and second opposite side panels, and first and second actuator means for each of the first and second lift frames to raise the cover above the truck bed and to lower the cover to stow it, each actuator means being disposed on a respective first and second lower lift frame member to hang therefrom at an upward angle relative to horizontal within the truck bed proximate a respective one of the first and second opposite side panels.

21. The enclosure of claim 20 wherein each said actuator means is pivotally disposed on a respective first and second lower lift frame member.

22. The enclosure of claim 20 wherein said first and second lift frames each includes a first and second upper lift frame member affixed to said cover and overlying a respective first and second lower lift frame member with lower ends of said first and second arms disposed on the first and second lower lift frame members and with upper ends of said first and second arms disposed on the first and second upper lift frame members.

\* \* \* \* \*

UNITED STATES PATENT AND TRADEMARK OFFICE
CERTIFICATE OF CORRECTION

PATENT NO. : 6,209,944 B1  
DATED : April 3, 2001  
INVENTOR(S) : Charles R. Billiu et al.

Page 1 of 1

It is certified that error appears in the above-identified patent and that said Letters Patent is hereby corrected as shown below:

Column 9,  
Line 12, replace "connected to the cover" with -- enclosure --.  
Line 13, after "enclosure" (first and second occurrence) insert -- connected to the cover and --.  
Line 15, delete "on the".  
Line 16, delete "ground".  
Line 44, replace "slow" with -- stow --.

Column 10,  
Line 12, after "stow" insert -- , --.

Signed and Sealed this

Eighteenth Day of December, 2001

Attest:

Attesting Officer

JAMES E. ROGAN  
*Director of the United States Patent and Trademark Office*